United States Patent [19]

Gutleber

[11] Patent Number: 4,512,024
[45] Date of Patent: Apr. 16, 1985

[54] IMPULSE AUTOCORRELATION FUNCTION COMMUNICATIONS SYSTEM

[75] Inventor: Frank S. Gutleber, Little Silver, N.J.

[73] Assignee: The United States of America as represented by the Secretary of the Army, Washington, D.C.

[21] Appl. No.: 508,791

[22] Filed: Jun. 29, 1983

[51] Int. Cl.³ .......................... H04J 13/00; H04B 1/10
[52] U.S. Cl. ........................................ 375/34; 370/18; 375/38; 343/361
[58] Field of Search .................. 370/18, 19, 21; 375/1, 375/25, 34, 38, 96; 455/60; 343/361, 378, 380; 364/728, 819, 820

[56] References Cited

U.S. PATENT DOCUMENTS

| | | | |
|---|---|---|---|
| 3,519,746 | 9/1970 | Gutleber | 370/18 |
| 3,634,765 | 1/1972 | Gutleber | 375/34 |
| 4,084,137 | 4/1978 | Welti | 455/60 |
| 4,293,953 | 10/1981 | Gutleber | 375/25 |
| 4,475,215 | 10/1984 | Gutleber | 370/18 |

Primary Examiner—Benedict V. Safourek
Attorney, Agent, or Firm—Anthony T. Lane; Michael Zelenka; Jeremiah G. Murray

[57] ABSTRACT

A pulse code modulation communications system employing orthogonally separated noise code mate pairs having autocorrelation functions which upon detection in a matched filter and addition compress to a lobeless impulse. A mate pair of bi-polar digital noise codes are impressed on respective RF carriers generated by the same frequency source with one code mate being transmitted separately as a vertically polarized wave while the other code mate is transmitted separately as a horizontally polarized wave. The polarized RF carrier signals containing the code mates are respectively received by horizontally and vertically polarized antennas coupled to radio receiver apparatus which provides respective received signals containing the code mates. The code mates are then detected by matched filters which operate to compress the code mates. The compressed code mates are then linearly added to provide an output signal comprising a lobeless impulse signal.

18 Claims, 3 Drawing Figures

IMPULSE AUTOCORRELATION FUNCTION COMMUNICATIONS SYSTEM

The invention described herein may be manufactured, used and licensed by or for the Government for governmental purposes without the payment of any royalties thereon or therefor.

FIELD OF THE INVENTION

This invention relates generally to pulse code modulation communications systems and more particularly to a bi-orthogonal pulse code modulation communications system employing noise code mate pairs having autocorrelation functions which upon detection in a matched filter and addition compress to a lobeless impulse.

BACKGROUND OF THE INVENTION

The concept of generating and communicating with noise codes of the type termed code mates having correlation functions which upon detection provide an impulse autocorrelation function is generally known and shown, for example, in U.S. Pat. No. 3,519,746, entitled, "Means And Method To Obtain An Impulse Autocorrelation Function", which issued to Frank S. Gutleber, the present inventor, on July 7, 1970. Other examples include U.S. Pat. No. 3,634,765, entitled, "System To Provide An Impulse Autocorrelation Function Upon Linear Addition . . . " which issued to Frank S. Gutleber on Jan. 11, 1972, and U.S. Pat. No. 4,293,953, entitled, "Bi-Orthogonal PCM Communication System Employing Multiplexed Noise Codes", which issued to Frank S. Gutleber on Oct. 6, 1981. It is to this type of apparatus to which the present invention is generally directed.

Accordingly, it is an object of the present invention to provide an improvement in the generation and utilization of noise codes in communications systems.

Another object of the invention is to provide an improvement in bi-orthogonal pulse code modulation communications systems.

Still another object is to provide an improvement in noise code communications systems employing bi-orthogonal noise code mate pairs having autocorrelation functions which upon detection in a matched filter compress to an impulse.

These and other objects are achieved by a bi-orthogonal pulse code modulation communications system employing noise code mate pairs comprising a pair of bi-polar digital noise code mates which are impressed on respective RF carriers generated by the same frequency source with one code mate being transmitted separately as a vertically polarized wave while the other code mate is transmitted separately as a horizontally polarized wave and whereupon the orthogonally polarized RF carrier waves containing the code mates are respectively received by horizontally and vertically polarized antennas coupled to receiver apparatus which provides received signals containing the code mates, which signals are then fed to their matched filters which in turn operate to compress the code mates, the compressed code mates being furthermore fed to a linear adder which provides a compressed lobeless impulse output signal.

DESCRIPTION OF THE PREFERRED EMBODIMENT

Figure 1:
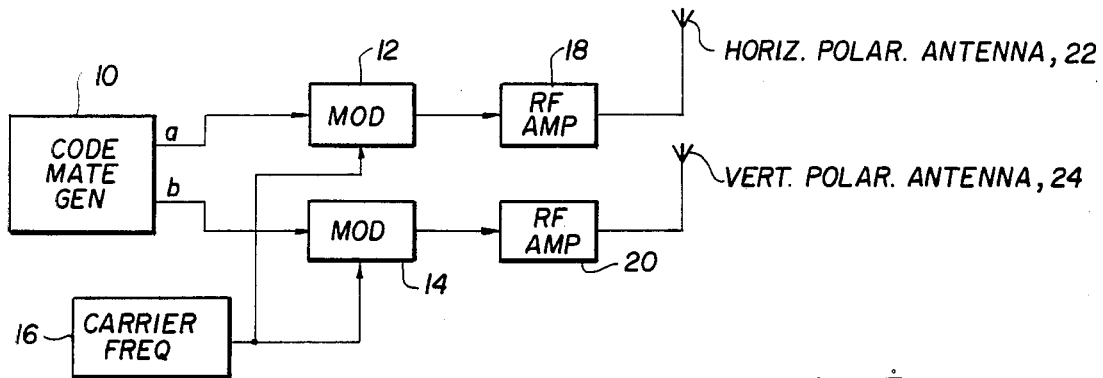
FIG. 1 is a functional block diagram illustrative of transmitter apparatus in accordance with the principles of this invention.

The present invention is directed to a bi-orthogonal pulse noise coded modulation communications system employing a type of multi-bit digital codes referred to as code mates, meaning that the information is coded with a composite code that is "noise like" in that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity, at all other times. When code mate signals, for example, are orthogonally multiplexed, matched filter detected and linearly added, there is provided a lobeless impulse output of a high amplitude at one given time ($\tau = 0$) and zero output at all other times ($\tau \neq 0$). For a pair of code mates a and b, this may be stated mathematically as, $$\phi_a(\tau) = -\phi_b(\tau) \quad (1)$$

for all $\tau \neq 0$, where $\phi_a(\tau)$ is the autocorrelation function of code a, $\phi_b(\tau)$ is the autocorrelation function of b, and where $\tau = 0$ is the location of the main lobe. This can be illustrated as follows. For code mate pairs a and b, where, for example, $$a = 100 \quad (2)$$

and $$b = 0010 \quad (3)$$

the autocorrelation function $\phi_a(\tau)$ of code a can be obtained in a well known fashion by detection in a matched filter comprised of, for example, a combination of time delay circuits, phase control circuits, and a linear adder, a typical example being shown and described in applicant's prior U.S. Pat. No. 4,293,953, referenced above. Such a matched filter detector develops a digital autocorrelation function sequence $\phi_a(\tau)$ which can be illustrated in the following manner as:

$$\phi_a(\tau) = \begin{matrix} 1\,0\,0\,0 \\ 1\,0\,0\,0 \\ 1\,0\,0\,0 \\ \underline{0\,1\,1\,1} \\ 1\,.\,0\,0^4 0\,.\,1 \\ \underset{\tau = 0}{\Uparrow} \end{matrix} \quad (4)$$

where 0 denotes a pulse of unit amplitude and positive polarity, 1 denotes a pulse of unit amplitude and negative polarity, the dot (.) denotes zero amplitude, and wherein the exponent signifies the amplitude of the respective pulses. Accordingly, in the expression of equation (4), the main lobe ($\tau=0$) comprises a positive pulse having an amplitude of 4.

In the same manner, the autocorrelation function $\phi_b(\tau)$ of code b can be developed in its corresponding matched filter in the following fashion:

$$\phi_b(\tau) = \begin{matrix} 0\ 0\ 1\ 0 \\ 1\ 1\ 0\ 1 \\ 0\ 0\ 1\ 0 \\ \underline{0\ 0\ 1\ 0} \\ 0\ .\ 1\ 0^4 1\ .\ 0 \\ \uparrow \\ \tau = 0 \end{matrix} \quad (5)$$

From equations (4) and (5) it can be seen that $\phi_a(\tau) = -\phi_b(\tau)$ for all $\tau \neq 0$, and furthermore compress to a lobeless impulse at $\tau=0$ when linearly added together. This is shown below as:

$$\begin{matrix} \phi_a(\tau) = 1\ .\ 0\ 0^4\ 0\ .\ 1 \\ \underline{\phi_b(\tau) = 0\ .\ 1\ 0^4\ 1\ .\ 0} \\ \phi_T(\tau) = \ldots 0^8 \ldots \end{matrix} \quad (6)$$

Referring now to the drawings, and more particularly to FIG. 1, shown therein is a noise code modulated transmitter where reference numeral 10 denotes a multibit digital signal generator for generating a pair of code mates a and b which may be, for example, a four digit code of the type shown in expressions (2) and (3). The codes a and b are outputted from the generator 10 in a time related multi-bit binary digital sequence where they are respectively applied to a pair of modulators 12 and 14, which receive carrier signals from a common carrier frequency RF generator 16. The modulators 12 and 14 are typically comprised of phase modulators which output separate bi-phase modulated codes; however, when desirable, the modulators may comprise frequency type modulators, or a combination thereof. The code mates a and b are operable to modulate the same carrier frequency but on separate carrier signals which appear at the output of the modulators 12 and 14. These separate carrier signals respectively modulated with the code mates a and b are coupled to RF amplifiers 18 and 20 after which they are orthogonally separated and transmitted by coupling the carrier modulated with the code mate a to a horizontally polarized antenna 22 while the carrier containing the code mate b is coupled to a vertically polarized antenna 24. Code a, accordingly, is transmitted separately as a horizontally polarized wave, while its code mate b is transmitted separately as a vertically polarized wave. Since a common carrier frequency is utilized for both code mates a and b, the transmitted carrier waves are coherent in phase and frequency.

Figure 2:
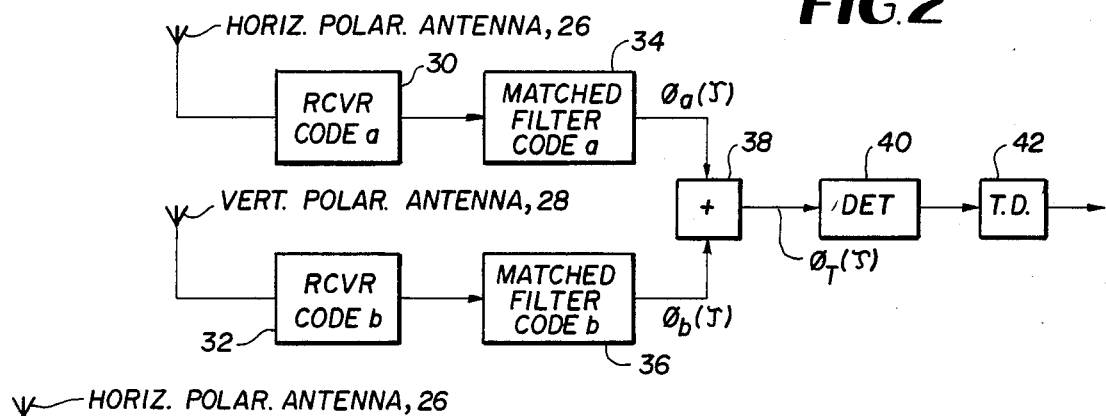
FIG. 2 is a functional block diagran of a first embodiment of receiver apparatus for use in conjunction with the transmitter apparatus of FIG. 1.

Referring now to FIG. 2, there is disclosed receiver apparatus which is responsive to the orthogonally polarized RF waves transmitted from the antennas 22 and 24. As shown, the receiver apparatus includes two receiving antennas 26 and 28 which are respectively horizontally polarized and vertically polarized so as to be responsive to the RF waves respectively radiated from horizontally polarized antenna 22 and the vertically polarized antenna 24. The horizontally polarized wave containing the code mate a upon being received by the antenna 26 is coupled to first RF receiver means 30. The receiver means 30 is operable to provide an output of an IF signal containing code mate a. In a like manner, the vertically polarized RF wave is received by the antenna 28 which is coupled to second receiver means 32 which is operable to provide an output of an IF signal containing the code mate b. The two IF signals outputted from the receivers 30 and 32 and containing the code mates a and b, respectively, are applied to their respective matched filters 34 and 36. The matched filters are typical of the type shown and described in the aforementioned U.S. Pat. No. 4,293,953. The matched filters are operable to compress the codes a and b at the IF frequency to provide respective autocorrelation function outputs $\phi_a(\tau)$ and $\phi_b(\tau)$ according to expressions (4) and (5). The autocorrelation function outputs of the matched filters 34 and 36 are applied to a linear adder 38 which is operable to provide a lobeless output signal $\phi_T(\tau)$ at the IF frequency in accordance with equation (6). The compressed signal is then coupled from the linear adder 38 to a video detector 40 which may be implemented in the form of a linear or square law detector with the output being fed to a threshold detector 42 for identifying signal presence.

Figure 3:
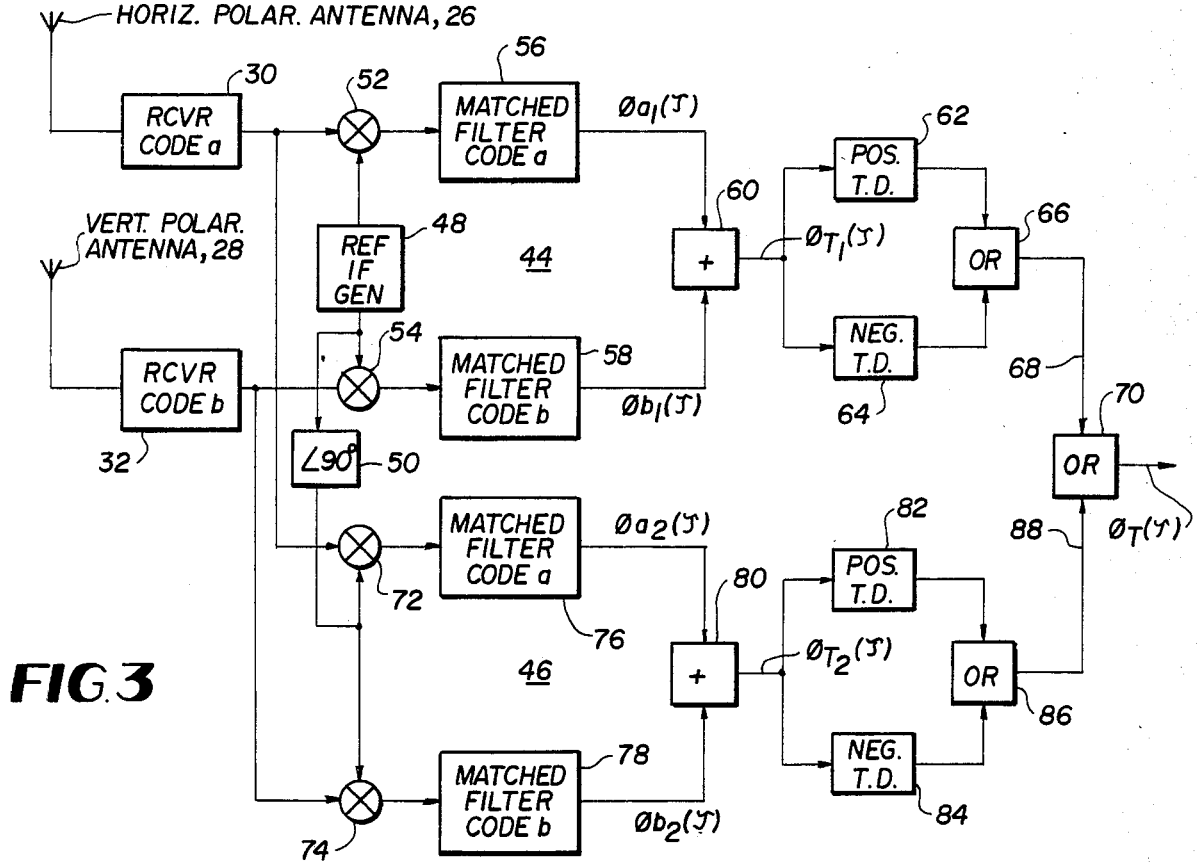
FIG. 3 is a functional block diagram of a second embodiment of receiver apparatus for use in conjunction with the transmitter apparatus of FIG. 1.

While the embodiment of FIG. 2 discloses a receiver configuration for matched filter detecting the code mates a and b at an IF frequency, the embodiment shown in FIG. 3 discloses a receiver configuration where the two code mates a and b upon being transmitted from the horizontally polarized antenna 22 and the vertically polarized antenna 24 of FIG. 1 are received and detected as video bi-polar codes for compressing to a single peak in a multiplexed bi-polar video matched filter. Considering now the embodiment shown in FIG. 3, the reference numerals 26, 28, 30 and 32 refer to the horizontally polarized and vertically polarized antennas shown in FIG. 2 as well as the two respective receivers which are operable to provide respective outputs of IF signals containing the code mates a and b. Additionally, however, the two IF signals are phase detected in two parallel orthogonal signal channels 44 and 46 where the IF signals in channel 44 are compared in phase against a reference IF signal generated by a reference IF signal generator 48. In a like manner, the signals in channel 46 are compared in phase with IF signals outputted from the reference generator 48 but the reference IF signal is shifted in phase by 90° by a phase shifter 50. The purpose of the two signal channels is to detect the signal when the phase difference between RF waves arriving at the receiving antennas 26 and 28 is in the vicinity of ±90°, the phase being unknown since the time of arrival of the signal is unknown.

Accordingly, the IF outputs from the receivers 30 and 32 and the reference IF are first coupled to a pair of signal multipliers 52 and 54 in signal channel 44 which provide bi-polar video output signals which are coupled to a pair of matched filters 56 and 58. The output of the matched filters 56 and 58, respectively, comprise compressed codes $\phi_{a1}(\tau)$ and $\phi_{b1}(\tau)$ which are fed to a linear adder 60. The linear adder 60, as before, combines the compressed codes a and b to yield a lobeless impulse signal $\phi_{T1}(\tau)$ whose amplitude depends upon the phase difference between the IF input signals to the multipliers 52 and 54 and the IF signal from the reference IF signal generator 48. The linear adder 60 is coupled to a dual threshold detector comprised of a positive signal threshold detector 62 and a negative threshold detector 64, since the compressed output signal from the linear adder may be of positive or negative polarity. The detectors 62 and 64 are, moreover, coupled to an OR gate to provide either a positive or a negative polarity output of $\phi_{T1}(\tau)$ on a common signal line 68 which couples to a final OR gate 70 which is adapted to provide an output from either of the signal channels 44 or 46 for providing an output $\phi_T(\tau)$ from whichever channel identifies signal presence.

The second signal channel 46 is identical to the signal channel 44 and includes a pair of multipliers 72 and 74, respectively coupled to the IF signals containing the code mates a and b; however, the other input to the multipliers 72 and 74 comprises the IF reference frequency shifted by 90° by the phase shifter 50. The output of the multipliers 72 and 74 are fed to a second set of matched filters 76 and 78 which are operable to compress codes a and b, respectively, as before with the compressed codes $\phi_{a2}(\tau)$ and $\phi_{b2}(\tau)$ being fed to a second linear adder 80. The output of the linear adder 80 which also comprises a lobeless impulse $\phi_{T2}(\tau)$ is fed to another dual threshold detector comprised of a second positive threshold detector 82 and a negative threshold detector 84. The threshold detectors 82 and 84 couple to an OR gate 66 which is adapted to provide either a positive or negative output of $\phi_{T2}(\tau)$ from the signal channel 46 on circuit lead 88 which is applied to the final OR gate 70. Thus where the phase of the received signals is unknown, the output of channels 44 and 46 may be of either positive or negative polarity; however, since either matched filter set identifies signal presence, the output signal will appear at the output of the OR gate 70.

Having shown and described what is at present considered to be the preferred embodiments of the invention, it is to be noted that the same has been made by way of illustration and not limitation. Accordingly, all modifications, alterations and substitutions may be made without departing from the spirit and scope of the invention as set forth in the appended claims.

I claim:

1. A bi-orthogonal pulse code modulation communication system, comprising:
   means for generating first and second multi-bit digital noise codes;
   means for generating first and second RF carrier signals;
   means for modulating said first and second noise codes on said first and second RF carrier signals;
   first transmitting antenna means having a first type polarization coupled to said first carrier signal for radiating a first polarized RF carrier wave modulated with said first noise code;
   second transmitting antenna means having a second type polarization coupled to said second carrier signal for radiating a second polarized RF carrier wave modulated with said second noise code;
   first receiving antenna means having said first type polarization and being receptive of said first polarized RF carrier wave;
   second receiving antenna means having said second type polarization and being receptive of said second polarized RF carrier wave;
   receiver means coupled to said first and second receiving antenna means for processing respective first and second received signals containing said noise codes from said first and second polarized RF carrier waves received by said antenna means;
   means coupled to said receiver means for autocorrelation detecting said first and second received signals for detecting said first and second noise codes and providing thereby first and second compressed output signals; and
   means for combining said first and second compressed output signals to provide a substantially lobeless impulse output signal.

2. The system of claim 1 wherein said first type of polarization comprises horizontal polarization and said second type of polarization comprises vertical polarization.

3. The system of claim 2 wherein said first and second noise codes comprise a pair of code mates which upon detection with a matched filter produces an impuse autocorrelation function.

4. The system of claim 3 wherein said means for autocorrelation detecting comprises first matched filter means for detecting the first of said pair of code mates and second matched filter means for detecting the second of said pair of code mates.

5. The system of claim 4 and wherein said combining means comprises linear adder means for providing said lobeless impulse output signal.

6. The system of claim 5 wherein said receiver means comprises first and second receiver apparatus respectively coupled to said first and second receiving antenna means, said first receiver apparatus being operable to provide said first code mate at an IF frequency and said second receiver apparatus being operable to provide said second code mate at said IF frequency.

7. The system of claim 5 wherein said first and second RF carrier signals comprise coherent signals derived from a common source and wherein said first and second received signals comprise IF signals.

8. The system of claim 7 and wherein said first matched filter means comprises a first matched filter coupled to one of said IF signals and wherein said second matched filter means comprises a second matched filter coupled to the other of said IF signals.

9. The system of claim 3 wherein said means for autocorrelation detecting comprises first and second mutually orthogonal signal detection channels coupled to said receiver means and being respectively responsive to said first and second received signals, each said channel including means for bi-polar video matched filter detecting said pair of code mates to provide a respective pair of compressed code mate signals,
   and wherein said combining means comprises first and second means for linearly adding said pairs of compressed code mate signals provided by said first and second detection channels to provide said lobeless impulse output signal.

10. The system of claim 9 wherein said first and second received signals comprises first and second IF signals of said pair of code mates, and
    wherein said means for bi-polar video matched filter detecting in each of said channels comprises: means for providing a reference IF signal; means for detecting the phase difference between said first and second IF signals and said reference IF signal in one of said channels to provide first and second video signals of said pair of code mates the amplitude and polarity of which are function of said phase difference, and first and second matched filters respectively coupled to said first and second video signals for providing a pair of compressed code mate signals for said first detection channel; means for shifting the phase of said reference IF signal by 90°; means for detecting the phase difference between said first and second IF signals and said reference IF shifted in phase by 90° in the other of said channels to provide third and fourth video signals of said pair of code mates whose amplitude and polarity are a function of said last recited phase difference, and third and fourth matched filters respectively coupled to said third and fourth video signals for providing a pair of compressed code mate signals for said second detection channel.

11. The system of claim 10 and additionally including respective positive and negative polarity threshold detector means coupled to said first and second means for linearly adding for identifying signal presence of said lobeless impulse output signal from either of said detection channels.

12. The system of claim 11 and additionally including means coupled to said threshold detector means for providing a common output of a lobless impulse output signal detected in said first and second detection channels.

13. The system of claim 12 wherein said means for providing a common output comprises an OR gate.

14. A method of communicating in a bi-orthogonal pulse code modulation communications system, comprising the steps of:
generating first and second multi-bit digital noise codes;
generating first and second RF carrier signals;
modulating said first and second noise codes on said first and second RF carrier signals;
radiating a first polarized RF carrier wave modulated with said first noise code from first transmitting antenna means, having a first type polarization, coupled to said first carrier signal;
radiating a second polarized RF carrier wave modulated with said second noise code from second transmitting antenna means, having a second type polarization, coupled to said second carrier signals;
receiving said first polarized RF carrier wave by a first receiving antenna means having said first type polarization;
receiving said second polarized RF carrier wave by a second receiving antenna means having said second type polarization;
providing respective first and second received signals containing said noise codes upon reception of said first and second polarized RF carrier waves by said first and second receiving antenna means;
autocorrelation detecting said first and second received signals for detecting said first and second noise codes and providing first and second compressed output signals; and
combining said first and second compressed output signals for providing a substantially lobeless impulse output signal.

15. The method of claim 14 wherein said first type of polarization comprises horizontal polarization and said second type of polarization comprises vertical polarization.

16. The method of claim 15 wherein said first and second noise codes comprise a pair of code mates and wherein said step of autocorrelation detecting comprises the step of detecting with a matched filter and producing thereby an impulse autocorrelation function.

17. The method of claim 16 and wherein said combining step comprises linearly adding said first and second compressed output signals for providing said lobeless impulse output signal.

18. The method of claim 17 wherein said step of generating said first and second carrier signals comprises generating RF carrier signals which are coherent and of the same frequency.

* * * * *